March 13, 1934.     M. J. TARR     1,951,220
ROD COUPLING
Filed Sept. 13, 1932
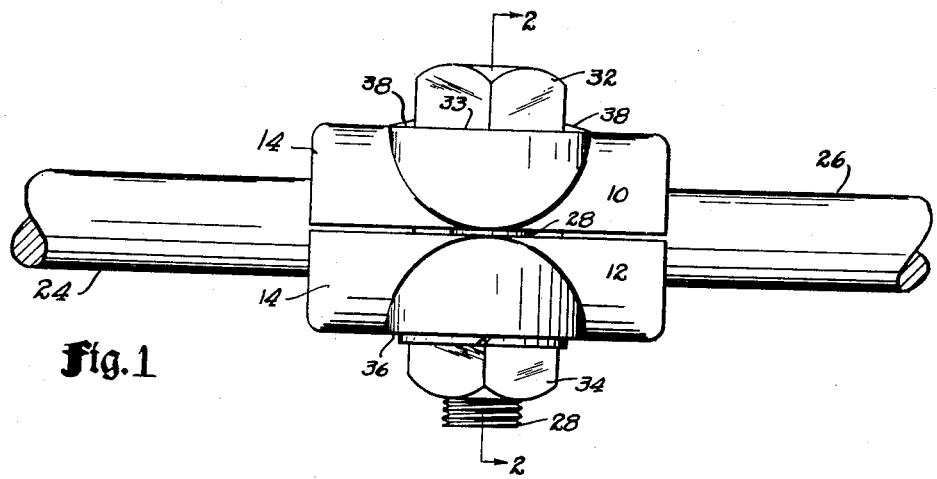
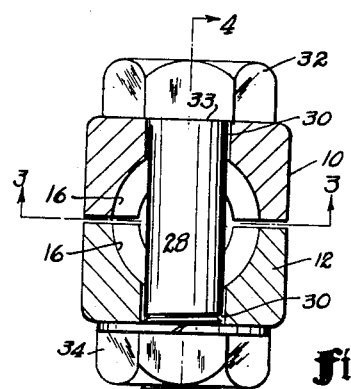
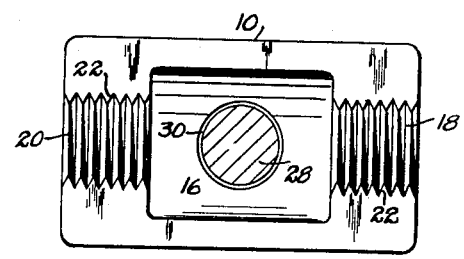
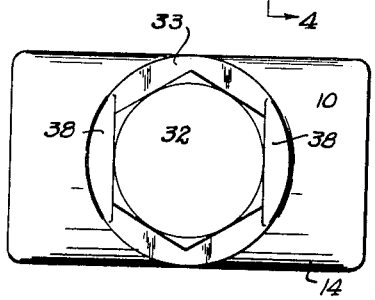
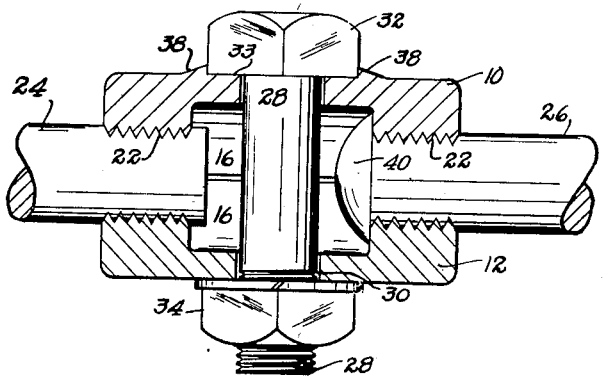
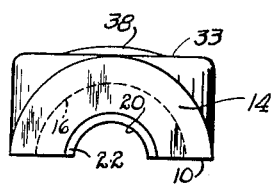
Morris J. Tarr, INVENTOR
BY Justin W. Macklin, ATTORNEY Patented Mar. 13, 1934

1,951,220

UNITED STATES PATENT OFFICE 1,951,220

ROD COUPLING

Morris J. Tarr, Lakewood, Ohio

Application September 13, 1932, Serial No. 632,910

3 Claims. (Cl. 287—111)

The improved shaft coupling comprising the present invention is primarily adapted for use in connecting adjacent sections of a sectional oilwell pumping rod together, although the principles of the invention are applicable to other uses, and the shaft coupling disclosed in this application may be employed for coupling the adjacent ends of shafts together, whatever be the nature of the shafts or whatever may be their intended use.

The present shaft coupling may, for example, be employed to connect adjacent ends of any sectional shaft together, regardless of the use to which the shaft is to be put, and whether the shaft be rotary, reciprocating or stationary. The device, however, is most useful in coupling shafts in which a push and pull action is to be effected, the coupling being equally effective in both the push and the pull action. The device is also applicable for providing extensions on shafts, rods, tubes or the like. The device may also be employed for connecting adjacent ends of steel cables, ropes, or the like together.

In oilwell pumping apparatus of the type above described, it has heretofore been customary to swage, swell or otherwise enlarge the adjacent ends of the rod sections. In order to couple the sections together, various clamping devices have been employed, which devices depend upon their engagement with the enlarged portions or heads provided on the adjacent ends of the rods for holding the rods together. Where a rod becomes broken, in order to couple the broken parts or sections of the rod together, it has been necessary to treat the ends of the broken rod in a forge to provide thereon a head for engagement with the clamping member. Such a procedure is a time consuming one and requires for its carrying out the use of skilled labor.

The improved coupling disclosed in this application is capable of connecting the adjacent ends of broken sections together without the necessity of treating the broken sections in the above described manner, and consequently without the necessity of employing skilled labor, thus resulting in economy of operation. The present shaft coupling is capable of application to the adjacent ends of broken rod sections with a minimum amount of labor by simply clamping the coupling over the adjacent ends of the broken sections without necessitating any special treatment of the sections. The coupling however is capable of use in connecting adjacent sections of a sectional rod together, if these sections occur in their original form with the usual enlargements or heads thereon. The coupling is also capable of use in connecting the adjacent ends of rod sections together, where one section is provided with an enlarged head and where the other section is devoid of such a head. In fact, the coupling may be employed under any varying conditions of use for coupling adjacent ends of rod sections together, regardless of the nature of these sections.

In order to carry out the above mentioned objects and attain the advantages set forth, the invention contemplates the provision of a two part separable drop forged case hardened steel coupling, each part being provided with a pair of aligned clamping jaws, the jaws of one part opposing respective jaws on the other part when the coupling is assembled to clamp therebetween the adjacent ends of a sectional rod or shaft. The parts of the coupling are securely held together in such manner that opposite jaws are brought to bear upon the rod ends by means of a through-bolt, which passes through the two part coupling and extends between the adjacent ends of the shaft or rod to be coupled.

With all of the above mentioned objects and advantages of the invention in view, I have disclosed in the accompanying single sheet of drawings forming a part of this specification, one embodiment of a shaft coupling manufactured in accordance with the principles of the present invention, and in this drawing—

Fig. 1 is a side elevation of the improved coupling showing the same applied to the opposed adjacent ends of a sectional shaft.

Fig. 2 is a sectional view taken substantially along the line 2—2 of Fig. 1.

Fig. 3 is a bottom plan view of one part of the separable coupling member, taken along line 3—3 of Fig. 2.

Fig. 4 is a sectional view taken substantially along the line 4—4 of Fig. 2, and Fig. 5 is a top plan view of a part of the device shown in Fig. 1.

Fig. 6 is an end elevation of the view in Fig. 5.

In all of the above described views, like characters are employed to designate like references throughout.

Referring now to Fig. 1, the device involves in general organization a two-part separable clamping device comprised of an upper section 10 and lower section 12. These sections are substantially identical and are preferably formed of case hardened drop forged steel. Each section comprises a member having a semi-cylindrical outer surface 14, which surfaces are substantially continuous when the sections are assembled upon each other. Each section is provided with a recessed portion 16 and with a pair of aligned clamping jaws 18 and 20 in the form of semi-cylindrical recesses formed in the opposite ends of the sections. The recesses 18 and 20 are preferably serrated to provide a series of semi-cylindrical teeth 22 adapted to engage the metal from which the rod sections are formed when the device is assembled. The jaws 18 and 20 of the upper section 10 oppose the respective jaws 18 and 20 of the lower section 12 when the sections are assembled together, and serve to firmly grip the adjacent ends of a pair of rod sections 24 and 26 to couple these sections together.

When coupled together the ends of the sections 24 and 26 are maintained in spaced relationship and in order to securely hold the upper section 10 and the lower section 12 together, a clamping bolt 28 passes centrally through the sections 10 and 12 between the ends of the rod sections 24 and 26. In order to accommodate clamping bolt 28, each section is provided with an aperture 30, which apertures are aligned upon assembling of the sections.

The bolt 28 is provided with a head 32 adapted to bear against a raised flattened portion 33 on the section 10. The other end of the bolt 28 projects through the section 12 and has received thereon a nut 34 which bears against a raised flattened portion 36 on this latter section. In order to hold the bolt 28 against turning, the section 10 is provided with a pair of upstanding ears or lugs 38 adapted to straddle the head 32 on opposite sides thereof. The head 32 being seated when in position between these lugs 38, is prevented from turning. These lugs are omitted from the section 12 to permit turning of the nut 34 on the bolt 28.

The sections 10 and 12 as stated above are substantially identical in construction, the only difference existing between these sections being in the provision of the lugs 38 on the member 10 and the omission of these lugs on the section 12. However, in the manufacture of the device the same dies that are employed in the drop forging operation of forming the section 10 may be employed in forming the section 12. The lugs 38 may subsequently be ground from the sections 12 without requiring an undue amount of time or labor. If desired, however, a separate set of dies may be employed, one set being adapted to form the upper sections with the lugs 38 thereon and the other set being adapted to form lower sections 12 without these lugs. Irrespective, however, of these details in the manufacture of the coupling the essential features of the invention are at all times preserved.

In Fig. 4 the rod section 24 is shown as being gripped by the teeth 22 in one end of the sections 10 and 12. The end of the rod 26 is shown as being formed with a head 40 thereon, which is contained within the hollow portion formed by the recess 16 of the coupling sections 10 and 12. Heretofore in coupling rod sections together it has been customary to form such heads on the adjacent ends of the rods to be coupled together. The provision of such heads on adjacent rod sections is not essential to the present invention, although the coupling will accommodate such heads when they occur on one or both rod sections. The teeth of the opposite jaws 18 and 20 are drawn together on the rod ends as the nut 34 is tightened and thus the rod sections are securely held against relative longitudinal movement, regardless of whether the sections are provided with enlarged heads or not.

While the invention has been described in connection with oil well pumping apparatus, it is to be distinctly understood that the coupling is adapted for use in other arts and the same may be employed whether the members to be coupled together are rod sections of a pumping apparatus, or whether they are section shafts adapted for other uses. Accordingly the invention is not to be limited to the exact arrangement of parts shown in the accompanying drawing and described in the specification, and only insofar as the invention has been particularly pointed out in the claims accompanying this specification is the same to be limited.

I claim:

1. A shaft coupling comprising a two-part separable member having a circular body portion, a reinforcing portion comprising a circular body intersecting said first mentioned body at right angles thereto and centrally thereof, said two bodies being of substantially the same diameter, said second body having flat faces at each end thereof and a circular aperture therethrough extending between said faces, one of said faces having bolt head engaging lugs projecting therefrom, said first mentioned body having thickened shaft biting jaws at each end thereof, said jaws being internally threaded to a given diameter for the full length of said jaws, said first body also having a hollowed out portion of greater diameter than said given diameter intermediate said shaft clamping jaws, said hollowed out portion registering with said reinforcing body, and a circular bolt disposed in said circular aperture in said second body.

2. A shaft coupling comprising two half members adapted to be assembled together to join the ends of two opposing aligned rods or shafts, each of said members having thickened shaft biting and gripping jaws adjacent their ends, said jaws on one member being in opposing relation to the jaws on the other member and each jaw having threads cut therein such that when said jaws are assembled together the threads so cut represent a given diameter, each of said members also having a hollowed-out portion of a large diameter than said last mentioned diameter intermediate of and having a greater length than each of said shaft gripping jaws, each of said members also having a reinforcing portion intermediate its ends, said reinforcing portion being coextensive with the full width of each member and rising to a height equal to the thickness of said members and terminating in flat faces, said reinforcing portion being apertured therethrough to permit the entry therein of a circular bolt, said apertures being in alignment when said members are in assembled relation, and a bolt passing through said apertures and being adapted to be drawn up tightly against said faces to draw said members together to cause said jaws to bite into the ends of shafts held in alignment therebetween.

3. The combination with ends of shafts to be joined together and a shaft coupling comprising a two-part separable member, each part thereof being provided with a pair of thickened aligned internally threaded clamping jaws, the jaws of one part opposing respective jaws of the other part when said coupling is assembled, each of said parts having a reinforcing portion intermediate its ends coextensive with the width of each part and extending outwardly from the body of said part and terminating in a flat face, said faces being apertured therethrough, the aperture in one part being in alignment with the aperture in the other part, and a bolt passing through said apertures adapted to draw said parts tightly together, the reinforcing portions of each part being adapted to transmit pressure applied to said faces by said bolt to said jaws to cause said jaws to bite into said shaft ends held therebetween.

MORRIS J. TARR.